United States Patent [19]
Armstrong et al.

[11] 3,718,535
[45] Feb. 27, 1973

[54] PREFORMED SELF-SUPPORTING, FLEXIBLE AND COHERENT ELECTRICALLY HEATABLE LAMINAR STRUCTURE AND METHOD OF MANUFACTURE THEREOF

[75] Inventors: Ramsey C. Armstrong, Pacific Palisades; Herbert Hoover, III, San Marino, both of Calif.

[73] Assignee: The Sierracin Corporation, Sylmar, Calif.

[22] Filed: March 26, 1970

[21] Appl. No.: 22,878

Related U.S. Application Data

[63] Continuation-in-part of Ser. No. 634,296, April 27, 1967, abandoned, which is a continuation-in-part of Ser. No. 575,072, Aug. 25, 1966, abandoned.

[52] U.S. Cl. ..................161/165, 117/211, 156/102, 156/106, 156/151, 161/190, 161/191, 161/194, 161/204, 161/214, 161/218, 219/203
[51] Int. Cl. ...........................B60l 1/02, B32b 15/08
[58] Field of Search......161/214, 218, 189, 190, 192, 161/194, 197, 203, 204, 198, 199, 45, 41, 43, 44, 165; 219/202, 203, 528, 543, 544, 546, 547, 548, 549, 553; 156/87, 99, 102, 104, 106, 47, 150, 151; 52/171; 117/211

[56] References Cited

UNITED STATES PATENTS

| | | | |
|---|---|---|---|
| 2,484,484 | 10/1949 | Berry | 161/189 |
| 2,778,758 | 1/1957 | Henning | 161/189 |
| 2,813,960 | 11/1957 | Engle et al. | 219/19 |
| 2,837,454 | 6/1958 | Watkins et al. | 161/199 |
| 3,020,376 | 2/1962 | Hoffmann et al. | 161/45 UX |
| 3,234,062 | 2/1966 | Morris | 156/104 |
| 3,290,203 | 12/1966 | Antonson et al. | 161/218 X |
| 3,310,458 | 3/1967 | Mattimoe et al. | 161/248 |
| 3,388,035 | 6/1968 | Mattimoe et al. | 161/199 X |
| 3,398,040 | 8/1968 | Allen et al. | 161/192 X |
| 3,424,642 | 1/1969 | Orcutt | 219/303 X |

OTHER PUBLICATIONS

Randolph et al., Plastics Engineering Handbook, Reinhold, New York (1960) pages 495 and 501 relied on.

Primary Examiner—Robert F. Burnett
Assistant Examiner—Joseph C. Gil
Attorney—Lyon & Lyon

[57] ABSTRACT

Flexible sublaminates suitable for lamination between rigid transparent dielectric plies to form electrically powerable transparent safety glass-type constructions are prepared by first disposing on at least one surface of a carrier film a thin, adherent electrically conductive metallic coating and subsequently laminating to the metal-coated surface an interlayer film to form a flexible coherent laminar structure transparent when its exterior surfaces are smooth. Carrier films employed have an ultimate elongation of less than about 150 percent and tensile strength greater than about 5000 psi; interlayer films have ultimate elongation greater than about 150 percent and tensile strength less than about 6500 psi. Exemplary conductive metals are gold, silver, chromium, copper, and Inconel.

22 Claims, 3 Drawing Figures

INVENTOR.
RAMSEY C. ARMSTRONG
HERBERT HOOVER III
BY
*Lyon & Lyon*
ATTORNEYS

PREFORMED SELF-SUPPORTING, FLEXIBLE AND COHERENT ELECTRICALLY HEATABLE LAMINAR STRUCTURE AND METHOD OF MANUFACTURE THEREOF

CROSS-REFERENCES TO RELATED APPLICATIONS

This is a continuation in part of application Ser. No. 634,296, filed Apr. 27, 1967, now abandoned, which is in turn a continuation-in-part of application Ser. No. 575,072 filed Aug. 25, 1966, and now abandoned.

BACKGROUND OF THE INVENTION

This invention relates to electrically powerable transparencies.

It is well known that resistance to shatter in a window, aircraft canopy, windshield or the like can be markedly enhanced by providing a safety glass-type construction, i.e., one wherein flexible plastic interlayer films are disposed between and laminated to rigid transparent dielectric plies of, e.g., glass or polymethyl methacrylate.

The principal purpose of such constructions has been impartation of shatter resistance. However, it has been proposed that thin, transparent metal coatings be applied to the inner surface of one of the plurality of rigid plies employed in safety glass-type constructions. In the completed construction, electrical busbars and connections are made so that electrical current can be supplied to the contained conductive coating, rendering the construction electrically powerable. Heat generated by powered coatings in such applications can serve to prevent formation of ice or fog on the outside surfaces of transparencies used, e.g., as aircraft windshields or canopies. Such coatings are also useful for radio frequency attenuation or shielding, and can be used in laminated transparencies to reflect a portion of the sun's infrared radiation, thereby reducing heating within, e.g., an aircraft cockpit, while yet permitting vision through the laminated structure. Among the conductive coatings which have heretofore been employed for such purposes are tin oxide coatings, vacuum-deposited gold or copper and the like.

The thin, adherent electrically conductive metal coatings, when disposed directly onto a rigid ply as has heretofore been the practice, are by reason of their fragile nature peculiarly susceptible to disruption during the course of manufacture of the ultimate, powerable laminate. Subsequently in service, such disruptions occasion regions of unduly high local current density, leading to electrical burnout.

If a conductive metal coating is applied as by vacuum deposition directly on a rigid ply material such as glass, at a subsequent stage of manufacture when the glass is cut, e.g., to form a windshield, the cutting process itself can introduce disruptions along the metal-coated edge portions of the windshield blank to which busbars are subsequently to be applied. On the other hand, where the windshield blanks are cut before metal deposition, the subsequent metal deposition must needs proceed on a piecemeal basis and the advantages of continuous metallization are lost. The disadvantages of the alternative last-mentioned are multiplied by the practice of the safety glass industry in imparting curvature to the rigid plies between which the interlayer film is to be disposed. For example, windshield blanks are edge-supported in racks and heated in such racks so that, by reason of their weight, they sag to a desired curvature. To ensure that the two rigid plies of the windshield will be perfectly mated, two blanks are placed one atop the other in the rack, with the result that upon heating they sag conformably. If the ply itself is to be metallized, one of the sag-formed doublets must be separated from its mate in the process train, separately metallized, and then returned to that same mate for lamination of the ultimate structure. Accordingly, to the disadvantages of piecemeal metallization are added the difficulties inherent in increased handling of the typically fragile rigid plies.

By either alternative, i.e., whether the rigid ply material is metallized before or after blanks are cut therefrom, the fragile conductive metal coating is carried by the windshield blank in exposed condition for a substantial period between metallization and lay up and lamination of the ultimate safety glass-type construction.

It is proposed in U.S. Pat. No. 3,310,458 to Mattimoe et al. to laminate in a single lamination step a rigid transparent ply or plies of, e.g., polymethylmethacrylate with a polymerized diethylene glycol bis allyl carbonate sheet bearing an electrically conductive metal coating and with an interposed polyvinyl butyral interlayer film. That approach, to be sure, avoids certain difficulties experienced when the rigid ply itself is metallized, but other and more serious difficulties are engendered thereby. Those difficulties, seemingly not appreciated by the patentees, include the fact that the more expensive polymethylmethacrylate ply or plies are put at risk by single stage lamination. By the single stage approach the opportunity for testing to determine whether the fragile metal coating has survived lamination does not arise until the conductively coated sheet and interlayer have been, for all practical purposes, irrevocably joined to the rigid ply or plies. It now appears that the risk of disrupting the electrical continuity of the conductively coated sheet is greatest at the point of its first lamination. Should that disruption occur in the single stage lamination approach, then the rigid transparent plies must be discarded along with the interlayer and conductively coated sheet materials. Plies subjected to such risk and subsequently discarded might include sag-formed doublets, chemically tempered glass, optical glass for lense employment or other exotic materials for advanced laminated transparencies, so that the economic impact of such discard cannot be underestimated.

SUMMARY OF THE INVENTION

According to this invention, there is provided a flexible, coherent laminar structure primarily defined in two dimensions (i.e., length and width substantially greater than thickness) and transparent when its exterior surfaces are smooth which comprises a carrier film bearing on at least one surface a thin adherent electrically conductive metal coating disposed between the carrier film and an interlayer film adhered to the metal-coated surface of the carrier film. The flexible laminar structure includes and protects a conductive metallic coating borne by the carrier film.

The flexible laminar structures can be conveniently rolled or stacked for storage or shipment prior to disposition between rigid e.g., glass, plies and lamination to form electrically powerable transparencies. The carrier film can be, e.g., vacuum metallized on a continuous basis, laminated to an interlayer film at its metal-coated surface, and the laminate cut to any desired shape for disposition in an ultimate laminate such as an electrically powerable windshield without unduly disrupting the integrity of the contained conductive coating. The risk of disruption is greater at that point at which the metal-coated carrier film is first laminated than is the case in subsequent lamination, and by the sublaminate schema of the invention the occurrence of chance disruption can be conveniently detected by testing under power before the rigid transparent plies are put at risk.

The advantages of the invention will become more apparent from the detailed description which follows and from the attached drawing (not to scale) in which.

DETAILED DESCRIPTION OF THE INVENTION

Figure 1:
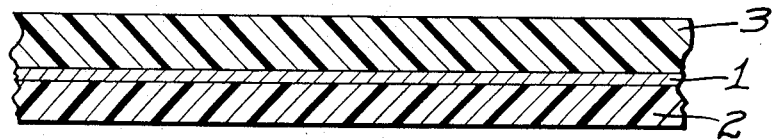
FIG. 1 depicts in cross-section a flexible laminar structure formed according to a first embodiment of the invention.

With reference now to FIG. 1, there is depicted a thin, adherent electrically conductive metal coating 1 disposed on carrier film 2 to form a metal-coated surface of the carrier film, which surface is bonded to interlayer film 3. The interlayer film can be bonded to the metal-coated surface of the carrier film by the conventional heat and pressure lamination in a manner which will be apparent to the art-skilled. For example, when the interlayer film is polyvinyl butyral and the carrier film "Mylar" (a polyethylene terephthalate polyester film sold by E. I. DuPont and Company), the sublaminate lay up is typically subjected to from 15 to 20 psi at 200°F. for approximately 2 hours. Sublaminates like that shown in FIG. 1 can be subsequently disposed between and laminated to rigid, transparent plies to form a safety glass-like construction. In the embodiment shown in FIG. 1, wherein a second interlayer film is not laminated to the exposed surface of the carrier film, it is generally desirable to employ a transparent adhesive in bonding the carrier film to the rigid ply. Suitable adhesives for the various materials which can be employed in this invention will occur to the art-skilled. In a preferred embodiment wherein the carrier film is a polyethylene terephthalate polyester film and the rigid ply is glass, adhesives which can optionally be employed include polyester adhesives (e.g., Nos. 46950, 46960, 46971 and 49690 in DuPont Technical Bulletin No. 17—"Polyester Adhesives"), polyamide resin adhesives such as "Versalon" 1140 (General Mills), and a wide variety of vinyl resin-based adhesives used in the safety glass-type construction industry.

The embodiment depicted in FIG. 1 is particularly suited for subsequent lamination between rigid plies wherein a second interlayer film is interposed between the exposed carrier film surface and one of the rigid plies. The second interlayer film, e.g., polyvinyl butyral, can serve in lieu of any adhesive in bonding the exposed carrier film surface to the adjacent glass or plastic ply. The sublaminate of FIG. 1 is particularly adapted to ultimate lamination in this manner when a sunshade tint band containing windshield or the like is contemplated as the end-product laminate. In conventional safety glass construction, such tint bands are incorporated by employment of interlayer material having a uniform sunshade-tinted band along one edge thereof. In order that the edge of the tint band appear horizontal (i.e., straight) to the driver when conformed to the compound curvature of an automobile windshield, that edge necessarily projects onto a flat plane as a non-rectilinear line. Conventional techniques for edge-dyeing interlayer sheets do not admit of provision for such non-rectilinear tint bands, so uniformly edge-dyed interlayers are instead stretched over a suitably shaped form to impart the proper geometry to the tint band prior to incorporation of the interlayer sheet in a windshield lay up.

Electrically powerable sublaminates do not admit of such stretching. Using the embodiment of FIG. 1, the sublaminate can be laid up with a pre-stretched band-bearing interlayer sheet and sag-formed windshield doublets and laminated. Thereby, the advantages of the tint band and of electrical powerability are obtained. Neither advantage need be sacrificed to the other.

Figure 2:
FIG. 2 depicts in cross-section a flexible laminar structure formed according to a second embodiment of the invention.

FIG. 2 illustrates an embodiment in which interlayer films 4 and 4' are adhered to either side of a carrier film 5 bearing electrically conducting metal coating 6. Exterior surfaces 7 and 7' can be textured as shown.

Figure 3:
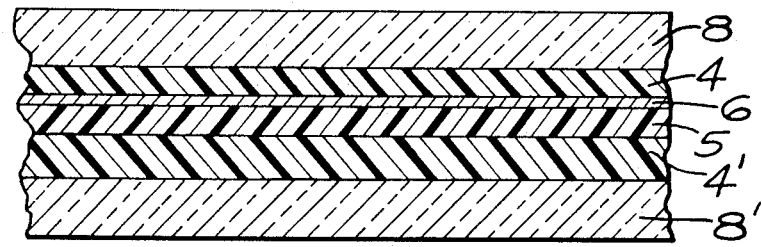
FIG. 3 depicts in cross-section a safety glass-type construction formed according to the invention and embodying the flexible laminar structure of FIG. 2.

FIG. 3 depicts a safety glass-type construction in which a sublaminate like that of FIG. 2 has been disposed between and bonded to rigid plies 8 and 8', e.g., glass plies. It will be noted that by the process of lamination itself, the texturing of the exterior surfaces of the sublaminate disappears so that the interlayer films are returned to the transparent condition in which they existed prior to texturing. Of course, the texturing of the interlayer films can occur simultaneously with the formation of the film. What is important to observe, in any case, is that the interlayer of film is of a material adapted to become transparent when its exterior surfaces are smooth. Typically, when the interlayer material is polyvinyl butyral and the rigid ply glass or polycarbonate, it can be laminated to the rigid plies by exposure to 200 psi at 275°F. for approximately 1 hour. When the rigid plies are of stretched methylmethacrylate, lamination typically has been effected at about 225°F., 200 psi over about 3 hours. When the rigid ply is "as cast" methylmethacrylate, lamination can be achieved at, e.g., 240°F., 200 psi over the course of about 1 hour. In every case, the optimal temperature, pressure and time for lamination of the sublaminates to the rigid plies can be readily determined by those skilled in the lamination art. This is particularly the case in the safety glass industry, wherein such interlayer films and rigid, transparent plies are commonly laminated under a variety of conditions and to a variety of ends.

Electrically powerable transparencies such as that depicted in FIG. 3 can be easily provided with busbars (not shown) to distribute electrical current thereto. For example, prior to the lamination of the various laminae of the sublaminate, a conductive metallic strip or braid can be placed along the edge portions of the lay up between the metal-coated surface of the carrier film and the interlayer film. Alternatively, conductive metallic particles, e.g., silver, can be applied in a resin binder along edge portions of the conductive metal coating to deposit an electrically continuous silver busbar. Other means of incorporating bus-bars in the sublaminates of the invention, as well as means for connecting the busbars to the source of power, will become apparent to the art-skilled in light of the above.

The term "carrier film" as used herein refers to a flexible plastic material transparent when its exterior surfaces are smooth and capable of enduring a vacuum metal deposition process and hence having a heat distortion temperature greater than about 120°F., preferably greater than about 150°F.; permitting of the deposition of satisfactory electrically conductive coatings and hence relatively free of plasticizers; and sufficiently dimensionally stable to avoid destruction of the electrical integrity of the coating borne by it during the temperature cycling experienced in lamination and during service powering. Carrier films can in particular instances be pretreated by conventional techniques to enhance their adherability to adjacent laminae; if desired. Polytetrafluoroethylene films are conventionally pretreated by glow discharge, immersion in sodium-liquid ammonia solution or in sodium naphthalene solutions (See U.S. Pat. No. 2,809,130 to Rappaport). Polyethylene terephthalate polyester carrier films can be subjected to glow discharge, hot aklaline solution (See U.S. Pat. No. 2,837,454 to Watkins, et al.) or flame treatment (e.g., British patent 828,381 to Gore, et al.).

Typical carrier films can range in thickness from about 0.00025 to 0.015 in., and thicker films can, if desired, be employed subject to the requirement of a suitable degree of flexibility and energy-absorbing ability. The energy-absorbing ability of laminae interposed between rigid plies in safety glass-type constructions is important in diminishing the consequences of head impact during vehicular accidents, and decreases with increasing thickness. Flexibility is required so that the sublaminate can be conformed to the compound curvature of sag-formed doublets and the like. An appropriate degree of flexibility is also quite important in vacuum metallization and sublaminate transportation. Flexibility decreases as thickness increases—the less flexible a material is, the greater is its minimum radius of curvature. Unduly inflexible materials, to the extent they can be rolled at all, must needs be rolled about a roll core whose diameter can become prohibitively great before the minimum radius of curvature for the material is realized. Vacuum metallization proceeds in a vacuum chamber. The complexities of constructing that chamber are greatly amplified when the carrier film to be metalized cannot be rolled and positioned in the chamber but must instead gain entrance to and leave the chamber by way of a complicated series of airlocks. A carrier film thickness of about 0.015 inch has been adopted above as a practical upper limit for most purposes, upon balance of all the foregoing considerations.

While precise quantification is difficult when the wide variety of suitable interlayer and carrier materials is considered, it can generally be said that typical carrier materials will have an ultimate elongation of less than about 150 percent and tensile strength greater than about 5000 psi, each parameter being defined according to ASTM D 412-68. The liberal interpretation intended of this general specification of elongation and tensile strength will be apparent from the following table, wherein there are listed suitable materials for carrier employment, together with ultimate elongations and tensile strengths in which they are presently available.

TABLE

| Carrier | Elongation (%) | Tensile strength (psi) |
| --- | --- | --- |
| cellulose acetate | 15–70 | 8,000–16,400 |
| cellulose triacetate | 10–40 | 9,000–16,000 |
| cellulose acetate butyrate | 50–100 | 5,000–9,000 |
| cellulose propionate | 60–80 | 4,000–5,000 |
| ethyl cellulose | 20–30 | 8,000–10,000 |
| polymethyl methacrylate (extruded, biaxially stretched) | 4–12 | 8,200–8,800 |
| polytrifluorochloroethylene copolymer | 50–150 | 5,000–10,000 |
| polyvinylfluoride | 115–250 | 7,000–18,000 |
| polycarbonate | 85–105 | 8,400–8,800 |
| polypropylene (biaxially oriented) | 50–200 | 12,000–33,000 |
| polymethyl methacrylate (Type A extruded) | 75 | 5,100 |
| polymethyl methacrylate (Type B extruded) | 12 | 7,800 |
| polyethylene terephthalate polyester | 60–165 | 20,000–35,000 |
| vinylidene chloride vinyl chloride copolymer | 35–110 | 8,000–20,000 |
| polyvinyl chloride (solvent cast, non-plasticized) | 3–100 | 6,000–9,000 |
| vinylchloride acetate copolymer (nonplasticized) | 3–100 | 5,500–8,000 |
| regenerated cellulose | 10–50 | 7,000–18,000 |

The carrier film can optionally be tinted to impart to the laminated safety glass-like construction a desired color density or gradient application of such properties.

The outer plies of the ultimate laminates formed according to the invention are of rigid, transparent dielectric glass or plastic material such as, in the case of glass, soda glass; and in the case of plastic, polycarbonate plies, polysulfone plies or plies of polymethylmethacrylate (as cast or biaxially stretched). Typically, such plies range in thickness from about 0.02 to 0.25 inches.

"Transparent" refers to that property of a material or structure which admits of the transmission of visible light without appreciable scattering such that objects beyond are clearly visible. Preferably, materials are chosen such that ultimate laminates transmit at least 70 percent of incident light. Of course, in architectural and other employments where light transmission is not critical, transmission can be as low as, e.g., 5 percent.

The term "interlayer film" as used herein refers to a film having rheological properties which permit optional texturing of its outer surface for deaeration during subsequent heat and pressure lamination, the textured substance becoming smooth during such lamination such that the resulting laminate is transparent; the material having bond strength to the rigid glass and plastic plies of the invention adequate to the purposes thereof. Typical candidates for interlayer employment include polyurethane, polyvinyl butyral, polyvinyl acetal, and polyvinyl chloride films, commonly ranging in thickness from about 0.015 to 0.030 inches. The interlayer materials are generally, but in particular instances need not be, plasticized with, e.g., plasticizers such as dioctyl phthalate, tricresol phosphate, dibutyl phthalate, dibutyl sebacate (DBS), triethylene glycol di-(2-ethyl-butyrate) commonly known as 3GH, as well as other conventional, e.g., alkyl phthalate or alkyl ester plasticizers. Plasticizing compounds are chosen according, primarily, to two criteria—mutual solubility or miscibility with the material plasticized (i.e., compatibility) and a boiling point sufficiently high as to prevent outgassing at temperatures experienced in manufacture and operation of the ultimate laminate. They are conventionally employed in proportions ranging from about 5 to 65 percent by weight of the plasticized material. Naturally, elongation and tensile strength of the interlayer material are influenced by the amount of plasticizer employed. Elongation capability of the interlayer film, of course, influences the so-called "head catch" capability thereof in employments such as interlayers in vehicle windshields. In the most general sense, interlayers employed in this invention have an ultimate elongation greater than about 150 percent and tensile strength less than about 6500 psi, preferably less than about 5000 psi. For example, polyvinyl butyral plasticized with 21 percent by weight of 3GH exhibits a tensile strength of 4750 psi and ultimate elongation of 200 percent; with 37.5 percent by weight DBS, tensile strength is 3050 psi and ultimate elongation 250 percent. Polyurethanes employed have displayed tensile strengths ranging from 4500 to 6500 psi and ultimate elongation ranging from 400 to 480 percent. Plasticized polyvinyl chloride ranges in tensile strength from about 1400 to 5600 psi and in ultimate elongation from 150 to 500 percent.

The thin, adherent electrically conductive metal coatings are disposed on the carrier film by conventional techniques such as vacuum deposition, sputtering and the like, preferably in thicknesses sufficient to provide a specific resistivity on the order of from about 2 to 100 ohms per square. Typical candidates for conductive coating include gold, silver, copper, chromium and inconel.

What is claimed is:

1. A preformed self-supporting flexible and coherent electrically heatable laminar structure primarily defined in two dimensions and transparent when its exterior surfaces are smooth consisting essentially of a carrier film bearing on at least one surface a thin electrically conducting metal coating disposed between said film and a first interlayer film, said first interlayer film being at least about 0.015 inch in thickness and adhered to the metal-coated side of said carrier film, the surface of said interlayer film opposite that adhered to said metal-coated side presenting an exterior surface of the said laminar structure, said laminar structure being adapted for further lamination between rigid transparent plies to form a safety glass-type laminate.

2. The structure of claim 1 wherein said interlayer film presents a textured exterior surface which is adapted to be made smooth by said further lamination of said structure between said plies.

3. The structure of claim 2 wherein but one surface of the carrier film bears a metal coating and further wherein a second interlayer film is adhered to the surface of the carrier film opposite the metal-coated surface thereof such that the non-adhered surfaces of the interlayer films present the exterior surfaces of the said laminar structure.

4. The structure of claim 2 wherein but one surface of the carrier film bears a metal coating, and further wherein an interlayer film is adhered only to the metal-coated surface of the carrier film.

5. The structure of claim 2 wherein the said carrier film is a polyethylene terephthalate polyester film, and wherein said interlayer film is selected from the group consisting of polyvinyl butyral, polyvinyl chloride, and polyurethane films.

6. The structure of claim 5 wherein said conductive metal is selected from the group consisting of gold, silver, chromium, copper and Inconel.

7. The structure of claim 6 wherein said interlayer film is polyvinyl butyral.

8. The structure of claim 7 wherein said conductive metal is gold.

9. The structure of claim 7 wherein said polyvinyl butyral contains from about 5 to 65 percent by weight plasticizer therefor, based on the total weight of plasticizer and polyvinyl butyral.

10. The structure of claim 2 wherein the said carrier film has an ultimate elongation of less than about 150 percent and tensile strength greater than about 5,000 psi, and wherein said interlayer film has an ultimate elongation of greater than about 150 percent and tensile strength less than about 6,500 psi.

11. The structure of claim 10 wherein said conductive metal is selected from the group consisting of gold, silver, chromium, copper and Inconel.

12. A method which comprises disposing a thin adherent electrically conductive metallic coating on at least one surface of a carrier film and subsequently laminating to the side of said carrier film which bears the said coating a first interlayer film, said first interlayer film being at least about 0.015 inch in thickness, thereby forming a flexible, self-supporting and coherent electrically heatable laminar structure primarily defined in two dimensions and transparent when its exterior surfaces are smooth, said laminar structure consisting essentially of the metal-coated carrier film and said interlayer film, the surface of said interlayer film opposite that laminated to said metal-coated side presenting an exterior surface of the laminar structure, said laminar structure being adapted for further lamination between rigid plies to form a transparent safety glass-type laminate.

13. The method of claim 12 wherein but one surface of the carrier film is metal-coated.

14. The method of claim 13 wherein an interlayer film is laminated only to the metal-coated surface of the carrier film.

15. The method of claim 13 wherein a second interlayer film is laminated to the surface of the carrier film opposite the metal-coated surface thereof such that the non-adhered surfaces of the interlayer films present the exterior surfaces of the laminar structure.

16. The method of claim 15 wherein the interlayer films present textured exterior surfaces which are adapted to be made smooth by said further lamination of said structure between said plies.

17. The method of claim 12 wherein the said carrier film is a polyethylene terephthalate polyester film and wherein said interlayer film is selected from the group consisting of polyvinyl butyral, polyvinyl chloride and polyurethane films.

18. The method of claim 17 wherein said conductive metal is selected from the group consisting of gold, silver, chromium, copper and Inconel.

19. The method of claim 18 wherein said interlayer film is polyvinyl butyral.

20. The method of claim 18 wherein said conductive metal is gold.

21. The method of claim 12 wherein the said carrier film has an ultimate elongation of less than about 150 percent and tensile strength greater than about 5,000 psi, and wherein said interlayer film has an ultimate elongation of greater than about 150 percent and tensile strength less than about 6,500 psi.

22. The method of claim 21 wherein said conductive metal is selected from the group consisting of gold, silver, chromium, copper and Inconel.

* * * * *